Oct. 31, 1961  G. A. REED ET AL  3,007,034
RUNWAY LIGHT
Filed Sept. 23, 1959
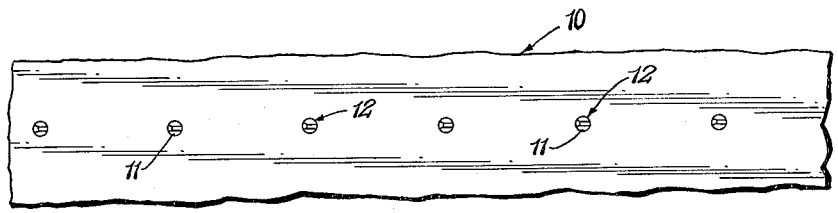
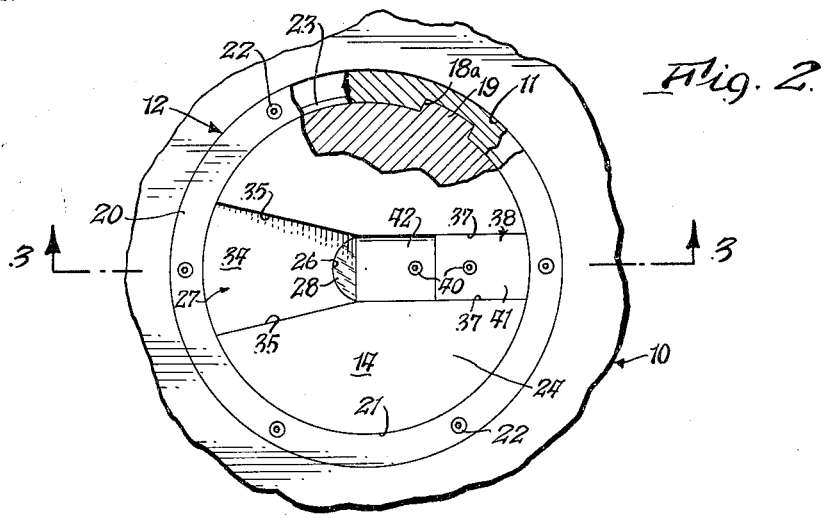
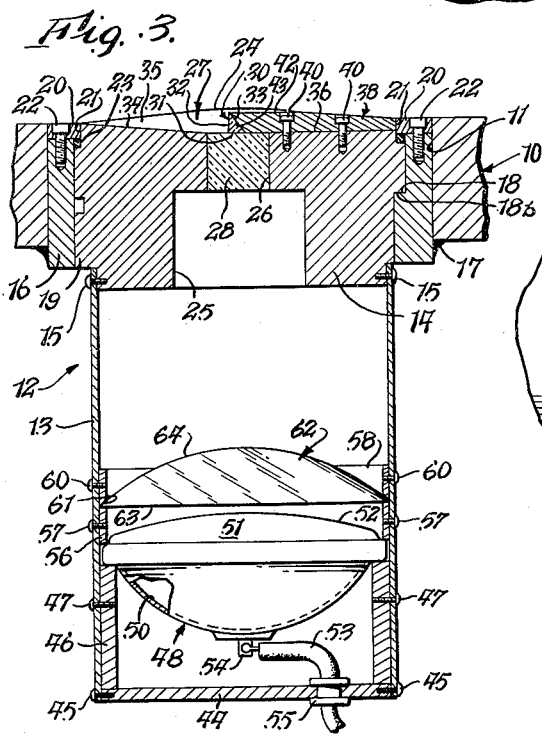
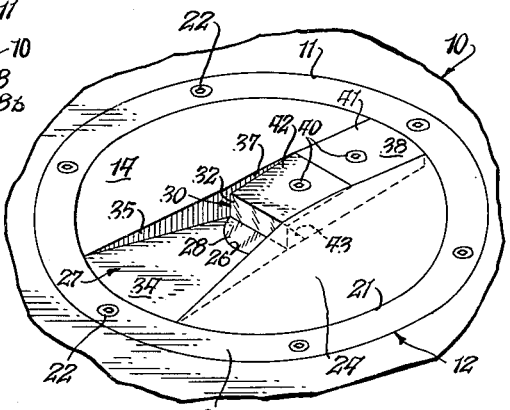
INVENTORS
George A. Reed
James A. Mott
BY Popp and Sommer
ATTORNEY

United States Patent Office 3,007,034
Patented Oct. 31, 1961

3,007,034
RUNWAY LIGHT
George A. Reed, Williamsville, and James A. Mott, Buffalo, N.Y., assignors to The Oxford Corporation, Williamsville, N.Y., a corporation of New York
Filed Sept. 23, 1959, Ser. No. 841,823
4 Claims. (Cl. 240—1.2)

This invention relates to a runway light for an aircraft landing surface, and more particularly to a runway light adapted to be mounted substantially flush with an aircraft carrier landing deck in an opening provided therein.

In view of the fact that aircraft must frequently land and take off at night and under adverse weather conditions, it has become imperative to provide runway lights for defining the landing area. At the same time, with the tremendous increase in landing and take-off speeds of present day aircraft, it has also become imperative that such runway lights should be sunken into the landing surface to leave this surface as unobstructed as possible to minimize accidents. The problem of satisfying these two requirements has been a most difficult one, especially as to aircraft carrier decks, because the beams from the lights must be of sufficient intensity to be readily seen by the landing aircraft, yet the zone of visibility must be limted for protection against enemy aircraft, and the lights must be able to withstand being run over by the wheels of the aircraft, as well as being struck by the heavy landing hook trailing down from the aircraft, without being put out of commission.

In a typical installation, the lights along the center line of a runway are spaced at 40 feet intervals and with a plane landing at a speed of 200 feet per second, five such lights will be passed over during one second. An existing light currently in use on aircraft carrier decks has a top plate which is raised about 1¼ inches above the deck surface. Even though suitably faired, such lights provide substantial abutments which can be struck rapidly, especially by the landing hook, and cases are known where these lights have been uprooted, thereby not only damaging the light and its mounting in the deck, but also creating a serious hazard for later approaching aircraft.

Accordingly, it is the primary object of this invention to provide a runway light which will satisfactorily solve these problems not only for aircraft carrier decks but for any type of landing surface, inasmuch as it is adapted to be mounted substantially flush with the landing surface, to provide an intensified beam of light that is readily visible to the landing aircraft, yet is accurately directed to limit its zone of visibility, and to withstand repeated impact from the aircraft wheels or landing hook without damage.

Another object of the invention is to provide a runway light that is efficient and economical in operation, simple, yet rugged in construction, and that can readily be installed in and removed from the opening in the landing surface, as well as easily assembled and disassembled to facilitate repair or replacement.

Other objects and advantages of the invention will become apparent upon consideration of the following detailed description and the accompanying drawing, wherein:

FIG. 1 is a partial top plan view on a reduced scale of an aircraft landing surface, such as a carrier deck, provided with a series of runway lights embodying the invention;

FIG. 2 is an enlarged top plan view of one inventive runway light shown in FIG. 1 and partially broken away to illustrate the mounting of the light in the carrier deck;

FIG. 3 is a vertical sectional view taken on line 3—3 of FIG. 2, and

FIG. 4 is a perspective view of the top of the runway light illustrated in FIGS. 2 and 3.

Referring to the drawing, and particularly FIG. 1, there is shown therein a partial view of an aircraft landing surface such as as carrier deck, which is generally indicated at 10 and which is provided with a series of vertical, cylindrical openings 11 spaced longitudinally along its center line. Mounted in these openings are a series of runway lights 12 embodying the invention. In FIG. 1, it is to be assumed that the aircraft will be landing from left to right and that the lights will be casting their beams from right to left. While the lights 12 are shown along the center line of the deck 10, it will be obvious that they could also be located along the sides as well.

Referring now to FIGS. 2 through 4, the inventive runway light 12 and its mounting in opening 11 of deck 10 will be described in detail. The runway light 12 is composed of a housing including a cylindrical, tubular casing 13 which is recessed in opening 11 below deck 10 and a cylindrical cover 14 closing the upper end of casing 13 and removably secured thereto in any suitable manner as by screws 15. As will be apparent from FIG. 3, cover 14 is mounted within opening 11 substantially flush with deck 10 by means of an annular bushing 16 welded to the underside of deck 10 at 17. The bushing is provided with a counterbore so as to leave an upwardly facing annular shoulder 18. This shoulder 18 is interrupted at circumferentially spaced intervals by vertical grooves 18a for receiving arcuate tongues 19 formed on the outer periphery of cover 14 adjacent its lower end to prevent the latter from rotating out of position. The cover is prevented from falling through bushing 16 by the engagement between the downwardly facing surfaces 18b intermediate the tongues 19 and the shoulder 18, and is preventing from accidentally rising out of opening 11 by means of a retaining ring 20 fitting within an annular peripheral recess 21 on cover 14 and secured to the top of ring 16 by screws 22. Moisture is prevented from leaking down between cover 14 and bushing 16 by a suitable packing ring 23. As will be apparent, bushing 16 is recessed in opening 11 so that retaining ring 20 is also substantially flush with deck 10.

Cover 14 is provided with a shallow conical upper surface 24 tapering slightly upwardly from its outer periphery at the level of deck 10 and a recess 25 in its under surface, the reduced upper end 26 of which terminates at a level slightly below the level of the deck. It is worthy of note that upper surface 24 of cover 14 actually protrudes at its highest point only about ¼ inch above the level of deck 10, and for all pracical purposes can be considered to be substantially flush with the deck, thereby leaving the deck free of any hazardous obstructions.

In adidtion, cover 14 is provided with a transverse, upwardly open, U-shaped channel 27 extending diametrically through upper surface 24 in communiaction with the upper end 26 of recess 25. A cylindrical transparent plug 28 is secured in the upper end 26 of recess 25 by any suitable adhesive and the upper end surface of plug 28 is substantially flush with the terminus of the upper end 26 of the recess. A right triangular, optical glass prism 30 is arranged in and extends transversely across the center of channel 27, and preferably abuts the side walls of the channel at each end. The prism is provided with a lower face 31 secured on the upper end of plug 28 by any suitable transparent adhesive and facing toward the lower end of casing 13, an upright perpendicular face 32 facing outwardly through one radial portion of channel 27, and an inclined face 33. This inclined face 33 is a reflective surface. It is preferred to coat the surface 33 with a reflective substance such as silver or aluminum. The principal purpose of this coating is to keep the inclined face 33 from accumulating dirt or grime which would far more seriously impair the internal reflectance than the presence of a reflective substance.

The aforesaid one radial portion of channel 27 is defined by a lower wall 34 which is inclined upwardly from the upper end of plug 28 to the level of deck 10 and upright side walls 35 diverging outwardly from the opposite ends of the upright prism face 32 and tapering slightly downwardly to the level of deck 10. The opposite radial portion of channel 27 is defined by a level lower wall 36 extending outwardly from the upper end of plug 28 and parallel, upright side walls 37 extending outwardly from side walls 35 and tapering downwardly to the level of the deck. Mounted in this opposite radial portion of channel 27 is a back-up plate 38, which plate is removably secured to the cover 14 by screws 40, and is provided with an outer upper surface 41 tapering upwardly with the upper surface 24 of the cover, and a substantially level inner upper surface 42 recessed below upper surface 24 and terminating in an inner inclined end surface 43 protectively overlying the inclined face 33 of prism 30. Thus, if the top of the light happens to be struck by the wheels of the aircraft or its landing hook, the brunt of the blow will be taken by the upper surface 24 of cover 14 and the recessed plate 38 will provide adequate protection for the more fragile prism 30.

The lower end of casing 13 is closed by a circular plate 44 secured therein by screws 45 and supporting an annular collar 46 which is also secured within casing 13 by similar screws 47. A light source 48 rests upon the upper end of collar 46 and is preferably in the form of a "sealed beam lamp," being provided with a lower parabolic reflector 50 and a lens 51 having a slightly convex upper surface 52 for directing a beam of parallel light rays upwardly toward cover 14. The light source 48 is connected to a suitable source of electricity (not shown) by means of a cable 53 containing the necessary conductive wires one of which is shown connected to a terminal 54 on the lamp 48. The cable 53 passes through an insulating grommet 55 in plate 44.

A lower retaining ring 56 is mounted in casing 13 above light source 48 by screws 57 with its lower end overlapping lens 51 to maintain the light source in place, and an upper retaining ring 58 is mounted within casing 13 above lower retaining ring 56 by screws 60 and is provided with a chamfered lower end 61. A condensing lens 62 is mounted between rings 56 and 58 with its outer periphery fitting snugly within the chamfered end 61 and resting on the upper end of ring 56. Lens 62 is provided with a flat lower surface 63 and a pronounced convex upper surface 64 for intensifying the beam from light source 48 by causing the parallel light rays therefrom to converge upwardly through recess 25 and plug 28 and to focus upon prism 30. Thus, the prism turns and transmits substantially the entire intensified beam laterally outwardly through the aforesaid one radial portion of channel 27. The angle of inclined face 33 of the prism determines the angle of the projected beam with respect to the upper surface of the deck 10. Typically this angle is preferably a few degrees but can be any angle desired depending upon the inclination of prism face 33. The lateral width of the projected beam is determined essentially by the characteristics of the light source of lamp 48. The divergence of the side walls 35 is such as not to interfere with the lateral margins of the projected beam.

It will now become apparent how the inventive runway light accomplishes its various objects, inasmuch as cover 14 is mounted substantially flush with deck 10 to eliminate any undesirable obstructions on the deck, condensing lens 62 provides a beam of the desired intensity, and prism 30 transmits this intensified beam to provide a light which is readily visible to the landing aircraft, yet the beam is accurately directed above deck 10 through channel 27 in order to limit the zone in which the light is visible. It will also be apparent that the runway light of the invention is not only efficient and economical in operation but also simple and rugged in construction, being able to withstand repeated impact from the wheels or landing hook of the aircraft without damage. It will further be apparent that the inventive runway light can readily be installed in and removed from the opening in the deck, as well as assembled and disassembled, to facilitate repair or replacement of any of its parts.

While only one preferred embodiment of the invention has been described and illustrated herein, it is to be understood that various changes and modifications may be made in the invention by those skilled in the art, without departing from the spirit of the invention, the scope of which is to be determined by the appended claims.

What is claimed is:

1. A runway light, comprising a hollow cylindrical housing having at one end a shallow conical outer surface tapering slightly outwardly from its outer periphery and a transverse channel formed in and extending diametrically through said outer end surface, a right triangular prism arranged in and extending transversely across the center of said channel below said outer end surface and having one face facing toward the other end of said housing and a perpendicular face facing laterally outwardly through one radial portion of said channel, said one radial channel portion including an outwardly inclined inner wall and outwardly diverging side walls, the other radial channel portion including a level inner wall and parallel side walls, a back-up plate arranged in said other radial channel portion and having an inclined inner end surface recessed below said outer end surface of said housing and protectively overlying the inclined face of said prism, a light source arranged in said other end of said housing for directing a beam of parallel light rays toward said one end of said housing, and a condensing lens arranged between said light source and prism for intensifying said beam by causing said light rays to converge and focus upon said prism, whereby said prism turns and transmits substantially the entire intensified beam laterally outwardly through said one radial channel portion.

2. In an aircraft landing surface having an opening therein, a runway light comprising a hollow cylindrical housing having its lower end recessed in said opening below said landing surface and its upper end arranged in said opening substantially flush with said landing surface and provided with a shallow conical upper surface tapering slightly upwardly from the level of said landing surface and a transverse channel formed in and extending diametrically through said upper end surface, a right triangular prism arranged in and extending transversely across the center of said channel below said upper end surface of said housing and having one face located slightly below the level of said landing surface and facing toward the lower end of said housing and a perpendicular face facing laterally outwardly through one radial portion of said channel, said one radial channel portion including an upwardly inclined lower wall and outwardly diverging side walls, the other radial channel portion including a level lower wall and parallel side walls, a back-up plate arranged in said other radial channel portion and having an inclined inner end surface recessed below said upper end surface of said housing protectively overlying the inclined face of said prism, a light source arranged in the lower end of said housing for directing a beam of parallel light rays upwardly toward said upper end of said housing, and a condensing lens arranged between said light source and one prism face for intensifying said beam by causing said light rays to converge and focus upon said prism, whereby said prism turns and transmits substantially the entire intensified beam laterally outwardly above said landing surface and through said one radial channel portion.

3. A runway light adapted to be mounted substantially flush with an aircraft carrier landing deck, said light comprising an upright, hollow cylindrical housing including a lower tubular casing and a cover closing the upper end of said casing, said cover having a shallow conical upper surface tapering slightly upwardly from its outer periphery, a central cylindrical recess formed in its under surface, and a transverse channel formed in and extending diametrically through said upper surface in communication with the upper end of said recess, a translucent cylindrical plug arranged in said recess and having a level upper surface flush with the upper end of said recess, a right triangular prism arranged in and extending transversely across the center of said channel below the surface of said cover and having a lower face resting on the upper surface of said plug and facing toward the lower end of said casing and a perpendicular upright face facing outwardly through one radial portion of said channel, said one radial channel portion including a lower wall inclined upwardly from the upper surface of said plug and upright side walls diverging outwardly from said upright prism face, the other radial channel portion including a level lower wall and parallel side walls, a back-up plate arranged in said other radial channel portion and having an inclined inner end surface recessed below the upper surface of said cover and protectively overlying the inclined face of said prism, a light source arranged in the lower end of said casing for directing a beam of parallel light rays upwardly toward said cover, and a condensing lens arranged between said light source and said lower prism face for intensifying said beam by causing said light rays to converge through said plug and focus on said prism, whereby said prism turns and transmits substantially the entire intensified beam laterally outwardly through said one channel portion.

4. In an aircraft carrier landing deck having an upright cylindrical opening therein, a runway light comprising an upright cylindrical housing including a tubular casing recessed in said opening below said deck and a cover closing the upper end of said casing and arranged in said opening substantially flush with said deck, said cover having a shallow conical upper surface tapering slightly upwardly from the level of said deck, a central recess formed in its under surface and terminating at its upper end at a level slightly below said deck, and a transverse channel formed in and extending diametrically through said upper surface in communication with said recess, a transparent plug arranged in said recess and having a level upper surface flush with the terminus of the upper end of said recess, a right triangular prism arranged in and extending transversely across the center of said channel below the upper surface of said cover and having a lower face resting on the upper surface of said plug and facing toward the lower end of said casing and a perpendicular upright face facing laterally outwardly through one radial portion of said channel, said one radial channel portion including a lower wall inclined upwardly from the upper surface of said plug to the level of said deck and upright side walls diverging outwardly from said upright prism face, the other radial channel portion including a level lower wall and parallel upright side walls, a back-up plate arranged in said other radial channel portion and having an inclined inner end surface recessed below the upper surface of said cover and protectively overlying the inclined face of said prism, a light source arranged in the lower end of said casing for directing a beam of parallel light rays upwardly toward said cover, and a condensing lens arranged between said light source and said lower prism face for intensifying said beam by causing said light rays to converge through said plug and focus on said prism, whereby said prism turns and transmits substantially the entire intensified beam laterally outwardly above said deck and through said one radial channel portion.

References Cited in the file of this patent

UNITED STATES PATENTS

| | | |
|---|---|---|
| 2,098,702 | Gagnon | Nov. 9, 1937 |
| 2,297,799 | Pifer | Oct. 6, 1942 |
| 2,848,597 | Knottnerus | Aug. 19, 1958 |

FOREIGN PATENTS

| | | |
|---|---|---|
| 772,329 | France | Aug. 13, 1934 |
| 136,702 | Sweden | July 29, 1952 |
| 759,848 | Great Britain | Oct. 24, 1956 |